(12) United States Patent
Lee

(10) Patent No.: US 6,604,780 B2
(45) Date of Patent: Aug. 12, 2003

(54) STRUCTURE FOR MOUNTING A CRASH PAD OF AN AUTOMOBILE

(75) Inventor: Jong Yong Lee, Kyoungki-do (KR)

(73) Assignee: Hyundai Motor Company, Seoul (KR)

(*) Notice: Subject to any disclaimer, the term of this patent is extended or adjusted under 35 U.S.C. 154(b) by 145 days.

(21) Appl. No.: 09/750,937

(22) Filed: Dec. 29, 2000

(65) Prior Publication Data

US 2002/0043819 A1 Apr. 18, 2002

(30) Foreign Application Priority Data

Aug. 23, 2000 (KR) .............................. 00-48913

(51) Int. Cl.⁷ .................. B62D 25/14; B62D 25/08; F16B 19/00
(52) U.S. Cl. .................. 296/192; 296/29; 296/72; 280/752; 24/297; 411/508
(58) Field of Search .................. 296/192, 29, 70, 296/72; 280/752; 24/297, 453; 411/508

(56) References Cited

U.S. PATENT DOCUMENTS

| 4,146,263 A | * | 3/1979 | Watari |
| 4,943,102 A | * | 7/1990 | Hamamoto et al. ..... 296/192 X |
| 5,662,375 A | * | 9/1997 | Adams et al. ............ 24/297 X |
| 6,132,154 A | * | 10/2000 | Easter ...................... 24/297 X |

* cited by examiner

Primary Examiner—Joseph D. Pape
(74) Attorney, Agent, or Firm—Christie, Parker & Hale, LLP

(57) ABSTRACT

The present invention relates to a structure for mounting a crash pad of an automobile and more particularly, to the structure for mounting a crash pad of an automobile which can prevent from easy separation of a pin from a cap by employing an interlocking structure between the pin of a crash pad and the cap of a cowl panel and ensure better efficient processability by having a locking means formed at a lower end of the pin to lock a low portion of a cap.

3 Claims, 3 Drawing Sheets

STRUCTURE FOR MOUNTING A CRASH PAD OF AN AUTOMOBILE

CROSS-REFERENCE TO RELATED APPLICATION

This application claims priority of Korea patent Application No. 2000-48913, filed on Aug. 23, 2000.

BACKGROUND OF THE INVENTION

1. Field of the Invention

The present invention relates to a structure for mounting a crash pad of an automobile and more particularly, to a structure for mounting a crash pad of an automobile which can ensure to prevent from upward movement of a pin, rotation of a cap or easy separation of the pin from the cap during a process for mounting a crash pad by employing an interlocking structure between the pin of the crash pad and the cap of a cowl panel and having a locking means at a lower end of the pin to be locked into a bottom surface of the cap.

2. Information Disclosure Statement

In general, a most large-sized part such as a crash pad comprising a number of parts is made into a module and then assembled in an assembly line by means of a robot.

FIG. 1 is a sectional view showing a conventional structure for mounting a crash pad, specially, an upper mounting structure of the crash pad.

A pin 11 is mounted to the crash pad 10 made into a module by a tapping screw and then a cap 13 is mounted to a cowl panel 12. The pin 11 of the crash pad 10 is inserted and locked in vertical direction into the cap 13 of the cowl panel 12 by a robot to complete an assembling process of the crash pad 10.

Reference numeral 18 is a core of the crash pad 10, and reference numeral 19 is a locking portion of the cowl panel 12.

In the structure for mounting the crash pad 10 using the pin 11 and the cap 13 as described above, however, there are some problems such as an upward movement of the pin 11, or a rotation of the cap 13 from side to side or an easy separation of the pin 11 from the cap 13.

SUMMARY OF THE INVENTION

Therefore, it is an object of the present invention to provide a structure for mounting a crash pad of an automobile which provides an interlocking structure between a pin of a crash pad and a cap of a cowl panel to prevent a pin from separating from a cap and a locking means at a lower end of the pin to lock with a bottom surface of the cap to allow an assembling tolerance when the pin is inserted into the cap, whereby an assembling process of the crash pad can be performed effectively and efficiently.

BRIEF DESCRIPTION OF THE DRAWINGS

For fuller understanding of the nature and objects of the invention, reference should be had to the following detailed description taken in conjunction with the accompanying drawings in which.

Similar reference characters refer to similar parts throughout several views of the drawings.

DETAILED DESCRIPTION OF THE INVENTION

According to the present invention, a structure for mounting a crash pad in which a pin of the crash pad is locked into a cap of a cowl panel is characterized in that a locking protrusion directed upward is formed at an end of the pin, a locking groove opened upwardly is formed at an inner side of the cap for preventing a separation of the pin, and a locking piece extended forwardly is formed at a lower end of the pin to restrict an upward movement of the pin.

Especially, the locking piece has a length to correspond completely to a bottom surface of the cap and has a curved shape.

Also, the cap has a front surface on which a projecting portion is formed for supporting a front surface of the pin with a constant distance between the cap and the pin so that an assembling tolerance of the crash pad can be allowed.

The present invention is described in more detail as set for the hereunder.

Figure 1:
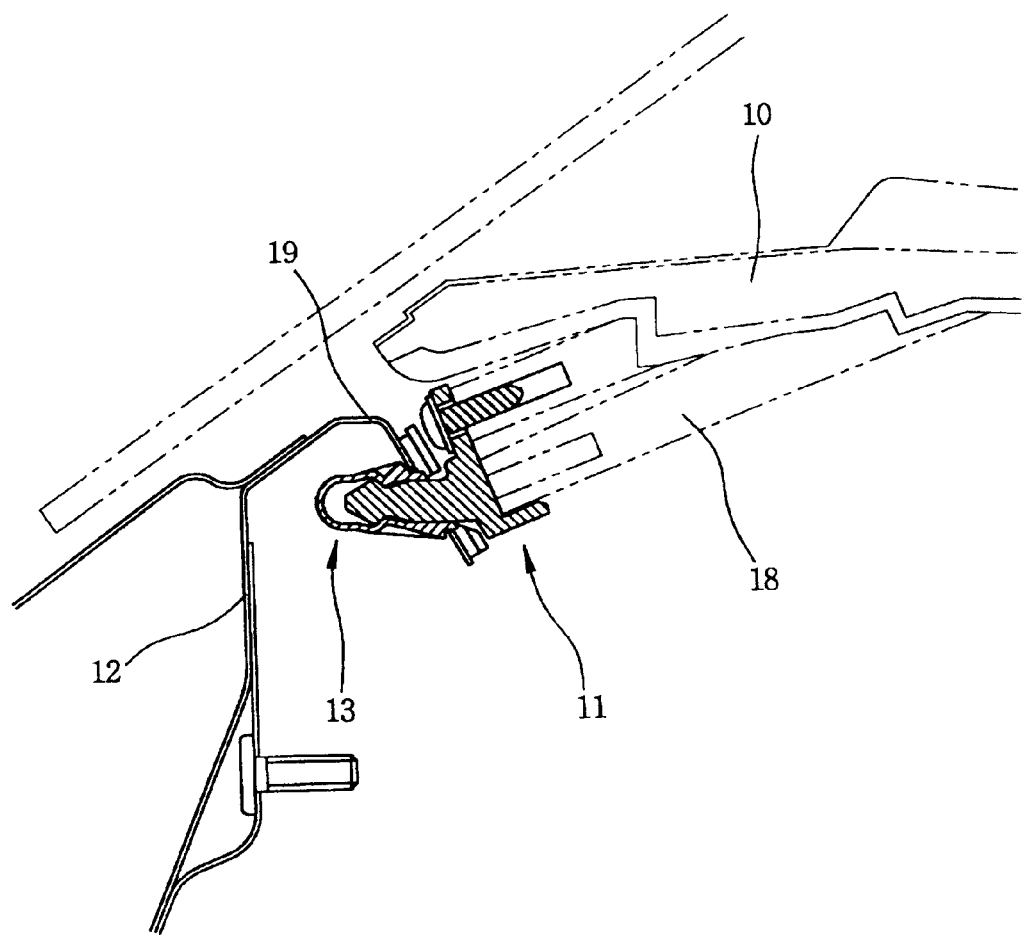
FIG. 1 is a sectional view showing a conventional structure for mounting a crash pad.
Figure 2:
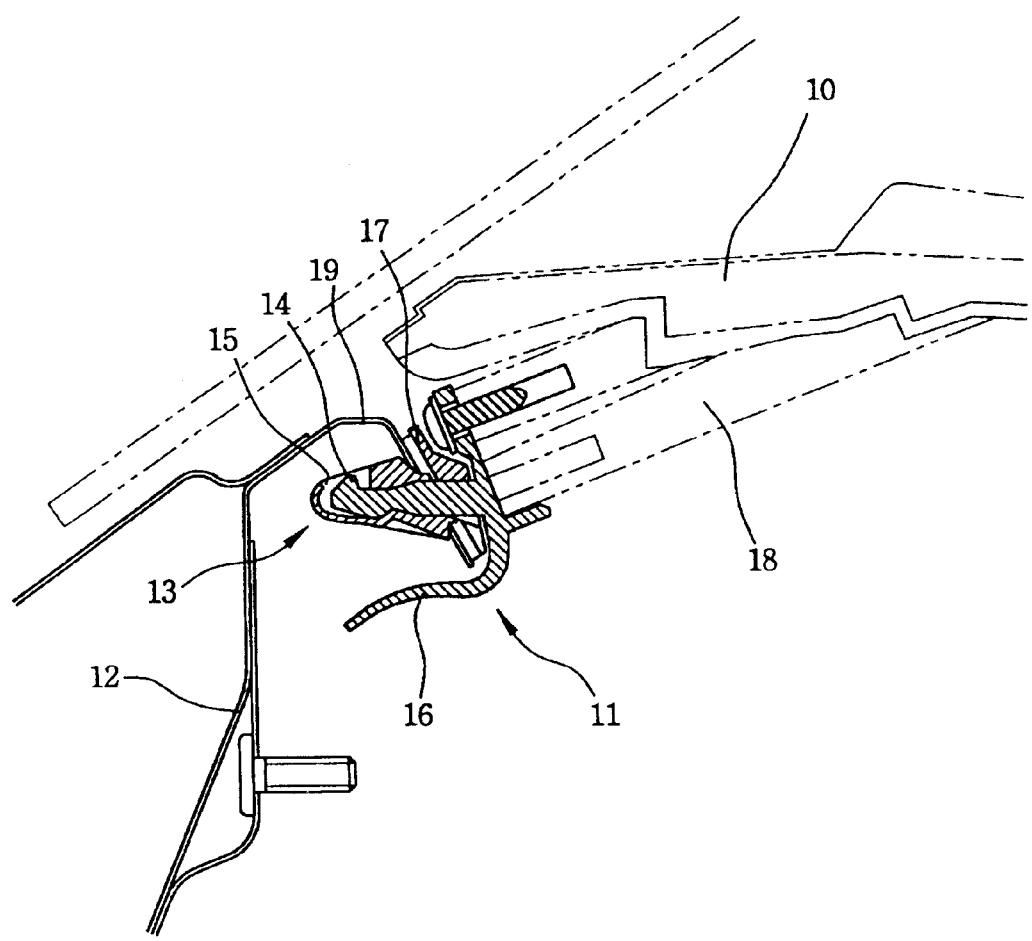
FIG. 2 is a sectional view showing a structure for mounting a crash pad according to the present invention.
Figure 3:
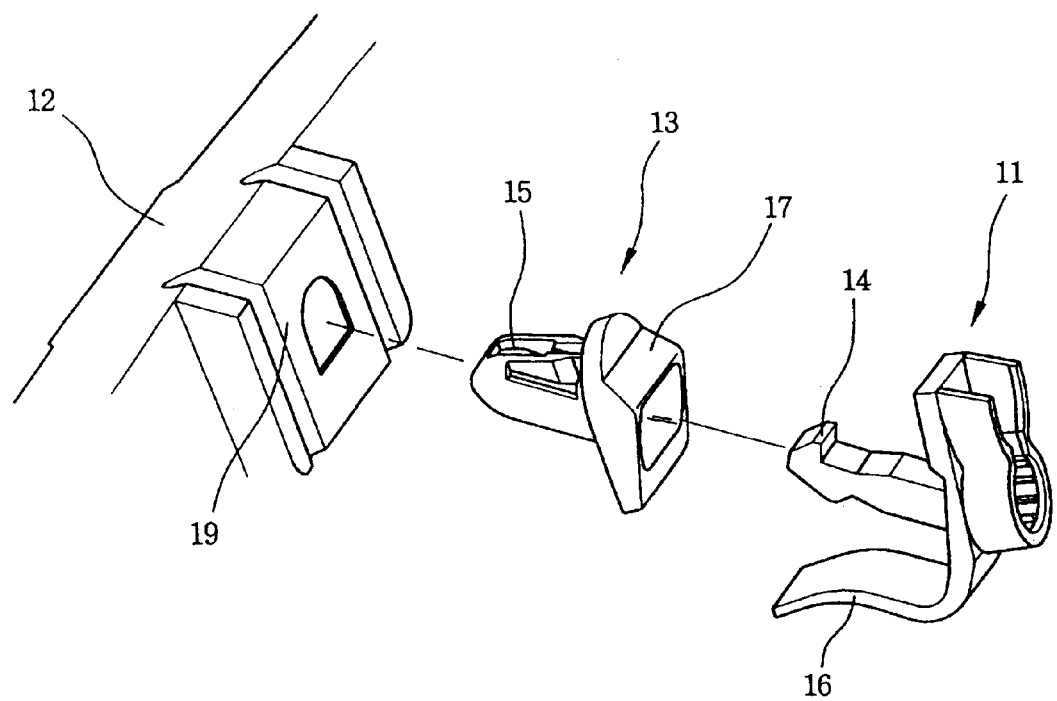
FIG. 3 is a perspective view showing a structure for mounting a crash pad according to the present invention.

FIG. 2 is a sectional view showing a structure for mounting a crash pad according to the present invention, and FIG. 3 is a perspective view showing a structure for mounting a crash pad according to the present invention.

As shown in FIG. 2 and FIG. 3, an upper locking protrusion 14 is formed integrally at the front end of the combining protrusion of the pin 11 which is combined with an upper core 18 of a crash pad 10 and a locking piece 16 extended forwardly is formed integrally at a lower end of a pin body.

Since the end of the locking piece 16 directed downwardly has a curved shape with a length for corresponding fully to the lower portion of a cap 13, it is possible to prevent the pin from deviating upwardly and to guide the entire crash pad 10 including the pin 11 during an assembling process.

There is a locking groove 15 at the inner side of an insert hole of the cap 13 to be mounted to the upper locking portion 19 of the cowl panel 12. The locking protrusion 14 formed at the end of the combining protrusion of the pin 11 is inserted into the locking groove 15 to prevent from separation of the pin 11 and to maintain the assembled state of the crash pad 10 securely.

Especially, a projecting portion 17 having a certain thickness is formed on the front surface of the cap 13 around which the combining protrusion of the pin 11 is inserted. Therefore, a distance of locking portion between the pin 11 and the cap 14 can be maintained through the projecting portion 17 to allow an assembling tolerance during an assembling process of the crash pad 10.

The process for mounting the crash pad 10 using the pin 11 and the cap 13 having the structure as described will be described.

First, the pin 11 is mounted to the upper portion of the core 18 of the crash pad 10 in a module state by a tapping screw, and the cap 13 is mounted to the locking portion 19 of the cowl panel 12.

Continuously, the pin 11 of the crash pad 10 is inserted into the cap 13 of the cowl panel 12 in a vertical direction by means of a robot.

When the pin 11 of the crash pad 10 is inserted into the cap 13 of the cowl panel 12 as described above, the combining protrusion of the pin 11 receives the combining protrusion inserting hole of the cap 13 and simultaneously the locking protrusion 14 of the pin 11 is locked into the locking groove 15 to prevent from easy separation of the pin 11 or a rotation of the cap 13 from side to side. And further, since the lower locking piece 16 of the pin 11 supports upwardly the lower portion of the cap 13, an upper movement of the pin 11 can be prevented completely.

As described above, the present invention provides a structure for mounting the crash pad using an interlocking structure between the pin of the crash pad and the cap of the cowl panel and having the locking means formed a lower end of the pin to be lock into a bottom surface of the cap, therefore, an upper movement of the pin or a rotation of the cap froth side to side or an easy separation of the pin from the cap which are generated during a process for mounting a crash pad can be prevented completely. Consequently, the assembling process of the crash pad can be performed effectively and efficiently.

Although this invention has been described in its preferred form with a certain degree of particularity, it is appreciated by those skilled in the art that the present disclosure of the preferred form has been made only by way of example and that numerous changes in the details of the construction, combination, and arrangement of parts may be resorted to without departing from the spirit and scope of the invention.

What is claimed is:

1. A structure for mounting a crash pad in which a pin of the crash pad is locked into a cap of a cowl panel characterized in that a locking protrusion directed upward is formed at the end of the pin, a locking groove opened upwardly is formed at an inner side of the cap for preventing easy separation of the pin, and a locking piece extended forwardly is formed at a lower end of the pin to restrict an upward movement of the pin.

2. The structure for mounting a crash pad according to claim 1, wherein said locking piece has a length to correspond completely to the bottom surface of the cap and has a curved shape.

3. The structure for mounting a crash pad according to claim 1, wherein an assembling tolerance of the crash pad can be allowed by employing a projecting portion mounted at the front surface of said cap with a constant distance from the front surface of said pin.

* * * * *